United States Patent [19]

Katsuno et al.

[11] Patent Number: 5,126,171
[45] Date of Patent: Jun. 30, 1992

[54] METHOD OF FORMING A SEALANT HAVING ORGANOPOLYSILOXANES AS A MAIN INGREDIENT

[75] Inventors: Nobuhiro Katsuno, Tokyo; Masatoshi Arai, Gunma, both of Japan

[73] Assignees: Three Bond Co., Ltd.; Shin-Etsu Chemical Co., Ltd., both of Tokyo, Japan

[21] Appl. No.: 552,186

[22] Filed: Jul. 13, 1990

[30] Foreign Application Priority Data

Jul. 18, 1989 [JP] Japan .................................. 1-183753

[51] Int. Cl.⁵ ............................................. B05D 3/02
[52] U.S. Cl. ..................................... 427/387; 264/54; 525/478; 528/32; 528/33; 528/34; 528/901
[58] Field of Search ........................ 525/478; 427/387; 264/54; 528/32, 33, 34, 901

[56] References Cited

U.S. PATENT DOCUMENTS 3,524,825  4/1959  Rill, Jr. ........................... 264/54
4,892,691  1/1990  Kolossow ......................... 264/54
4,960,847  10/1990  Arai et al. ....................... 525/477

*Primary Examiner*—Michael Lusignan
*Attorney, Agent, or Firm*—Wegner, Cantor, Mueller & Player

[57] ABSTRACT

A method of forming a sealant comprising steps of introducing liquids A and B, which are respectively prepared with specified organopolysiloxanes into a mixing chamber having a special rotor secured on the inside thereof, mixing the liquids A and B in the mixing chamber by rotating the special rotor, discharging the obtained mixture on the sealing surface of an article, such as an oil pan of car, and curing it to form the sealant.

The liquids A and B may be cured rapidly and finely to a deep level by mixing them in about equal amounts, and thus they are easily and homogeneously mixed, discharged on the sealing surface, and cured to form the sealant with said mixing chamber, and accordingly, the method is excellent in workability and is applied to on-line systems.

9 Claims, 2 Drawing Sheets

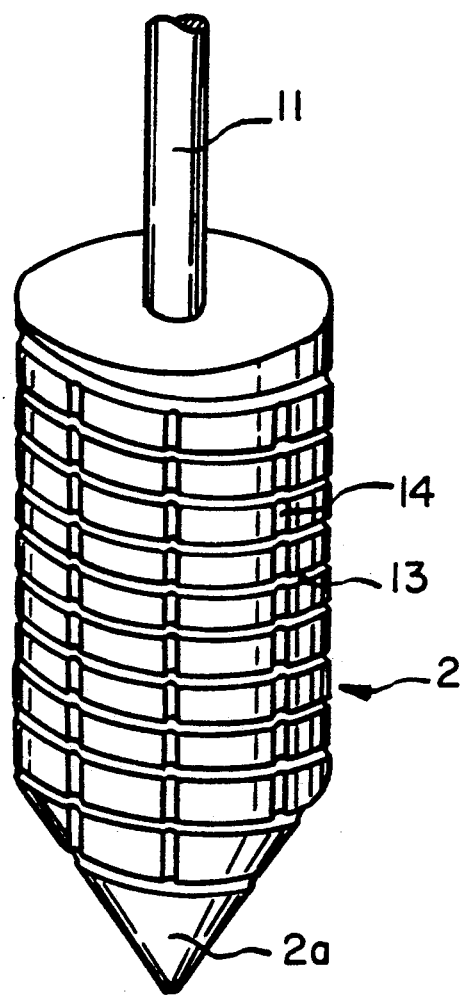

METHOD OF FORMING A SEALANT HAVING ORGANOPOLYSILOXANES AS A MAIN INGREDIENT

BACKGROUND OF THE INVENTION

1. Field of the Invention

The present invention relates to a method of forming a sealant applied on a sealing surface of car parts, electric or electronic parts and the like, and more particularly, a method of forming a sealant in which condensing polysiloxanes of two-liquid type, which are possible of curing rapidly and finely to a deep level by mixing the two liquids in about equal amounts, are used as a sealing material, these two liquids may be mixed homogeneously and rapidly with a simple step, and thus, it becomes excellent in workability and is applied to on-line systems.

2. Description of the prior Art

One-liquid type compositions which are cured by condensation are suitable for sealing materials of car parts, electric or elctronic parts etc. by the reason that they are very excellent in heat resistant, weather-proofing and electrical properties. Their curing processes are also proposed numerously, and are exemplified as diacetic acid type, dioxime type, dialcohol type, diacetone type and the like.

However, these are all, a type of gradually curing from the surface to the inside by reacting with the moisture in the air, and thus, the curing time becomes long, for example, it requires about 7 to 10 days for curing 10 mm, and about 1 month for curing 20 mm.

Especially, when the FIPG (foamed in place gasket) sealant used for the oil pan of a car engine is formed, it is scarcely cured to only the surface thereof since the car engine must be test-drived within about 1 hour from the sealing, and thus, there are some anxiety of troubles, such as oil leakage. Moreover, in case that they are used for adhering and fitting the electric or electronic parts, almost all are used in the on-line systems, and accordingly, said parts should be shipped within several hours after sealing. But, there occurs such inconvenience that they must be left as they are for all day long for curing.

To eliminate the afore-mentioned problems, such a technique that the prior compositions are used as a two-liquid type by deviding them into a main agent and a curing agent, is adopted. But, the amount of the curing agent is very small compared to the main agent, and thus, the mixing thereof is difficult, and moreover, the balancing between the main agent and the curing agent is difficult for homogeneous curing. As a result, the slight variation of the amount ratio makes the usable time very short, and thus, they are gelled during the mixing, or they are not cured, or they are cured from the surface just like a one-liquid type, and accordingly, it is scarcely placed into service.

SUMMARY OF THE INVENTION

It is an object of the present invention to provide a method of forming a sealant having organopolysiloxanes as a main ingredient wherein the disadvantages found in the prior are overcome.

It is another object of the present invention to provide such a method wherein condensing polysiloxanes of two-liquid type, which are possible of curing rapidly and finely to a deep level by mixing the two liquids in about equal amounts, are used as a sealing material.

It is furthermore another object of the present invention to provide such a method wherein said two liquids may be mixed homogeneously and rapidly with a simple step.

It is moreover another object of the present invention to provide such a method wherein it is excellent in workability and is applied to on-line systems.

According to the present invention, the above objects are accomplished by providing a method of forming a sealant having organopolysiloxanes as a main ingredient which comprises steps of separately introducing liquids A and B into a mixing chamber in about equal amounts, said liquid A being a mixture of organopolysiloxanes having a radical represented by a general formula of $-SiR_nX_{3-n}$ (in the formula, X is a hydrolyzable radical, R is a monohydorocarbon radical, n is 1 or 0) at both terminals of a molecular chain, and a condensing catacyst, said liquid B being organopolysiloxanes having at least two silanol radicals in one molecule, and said mixing chamber having a rotor secured in the inside thereof and a nozzle formed on the bottom thereof, said rotor being cut on the surface thereof to form grooves, mixing the both liquids in the mixing chamber by rotating the rotor, discharging the obtained mixture on the sealing surface of an article to be coated through said nozzle, and curing it to form a sealant.

BRIEF DESCRIPTION OF THE DRAWINGS

FIG. 1 shows a sectional view of one embodiment of the aparatus for practising the method of the present invention and FIG. 2 shows an another embodiment of the rotor in the aparatus of FIG. 1.

DETAILED DESCRIPTION

Figure 1:
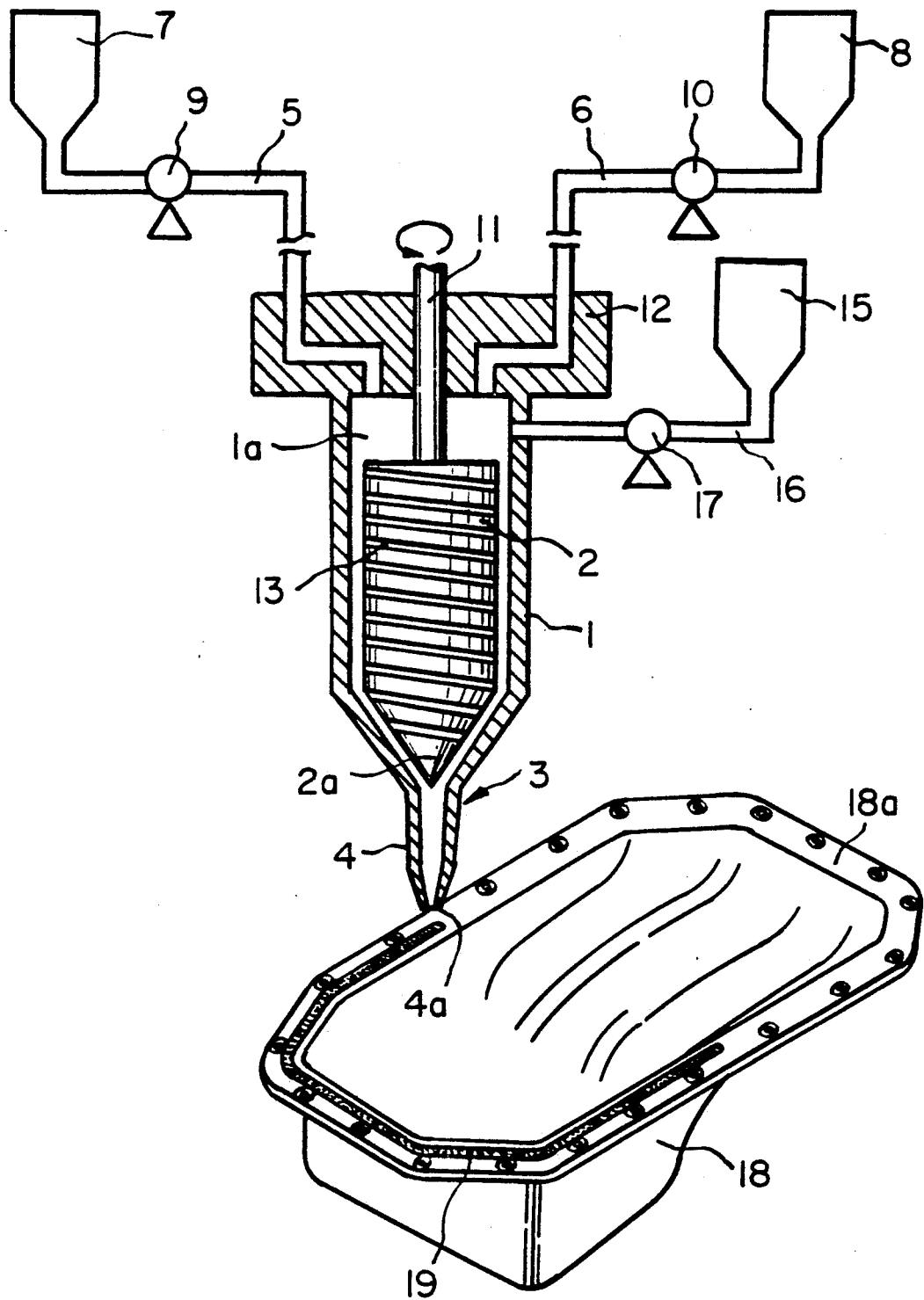

The present invention is illustrated in detail with the attached drawings as follows. FIG. 1 shows a sectional view of one embodiment of the aparatus for practising the method of the present invention. The reference numeral 1 shows a mixing chamber. In the inside 1a thereof, a rotor 2 is secured, and on the bottom 3 thereof, a nozzele 4 is formed. Moreover, tanks 7 and 8 are installed thereon to be connected with the inside 1a of the mixing chamber 1 through pipes 5 and 6, and pumps 9 and 10 are also installed on the desired positions of the pipes 5 and 6.

The rotor 2 is in a cylindrical shape tapered at the end 2a as indicated in FIG. 1, having a spindle 11 in a central axis, and is rotatably hung in the inside 1a of the mixing chamber 1 by piercing the top 12 of the mixing chamber 1 with an upper part of the spindle 11.

On the surface of the rotor 2, grooves 13 are cut. The grooves 13 may be in various shapes, such as spiral grooves 13 as mentioned in FIG. 1, or a combined grooves of longitudinal grooves 14 cut in plural at a desired distance and spirial grooves 13 as indicated in FIG. 2.

Additionally, the reference numeral 15 is a tank in which washing solvents, such as toluene, trichlene, etc. are contained, and it is connected to the inside 1a of the mixing chamber 1 through pipe 16. On the pipe 16, pump 17 is installed.

In the afore-mentioned aparatus, the sealing material of the condensing polysiloxanes of two-liquid type which are composed of liquids A and B are at first contained separately in the tanks 7 and 8, respectively. Said materials may be cured rapidly and finely to a deep level by mixing the liquids A and B in about equal amounts. The liquids A and B are respectively designated as follows.

LIQUID A

A mixture of organopolysiloxanes having at both terminals of a molecular chain, a radical represented by a general formula of $-SiR_nX_{3-n}$ (in the formula, X is a hydrolyzable radical, R is a monohydrocarbon radical, n is 1 or 0) and a condensing catalyst.

The R radicals of the organopolysiloxanes having at both terminals of the molecular chain, a radical represented by the general formula of $-SiR_nX_{3-n}$ are monohydrocarbon radicals, and may be exemplarily designated as methylradical, ethyl radical, propyl radical, vinyl radical, phenyl radical, trifluoropropyl radical etc. Moreover, the hydrolyzable radicals showm as X are indicated as acyloxy radicals, such as acetoxy radical, octanoyloxy radical, benzoyloxy radical, etc., ketoxime radicals, such as dimethyl ketoxime radical, methyl ethyl ketoxime radical, diethyl ketoxime radical, etc.. alkoxy radicals, such as metoxy radical, ethoxy radical, propoxy radical, etc., alkenyloxy radicals, such as isopropenyloxy radical, 1-ethyl-2-methylvinyloxy radical, etc., amino radicals, such as dimethylamino radical, diethylamino radical, butylamino radical, cyclohexylamino radical, etc., aminoxy radicals, such as dimethylaminoxy radical, diethylaminoxy radical, etc., amido radicals, such as N-methylacetamido radical, N-ethylacetamido radical, N-methylbenzamido radical, etc.

Moreover, the terminal reactive organopolysiloxanes of said ingredient are easily obtained by mixing the corresponding organopolysiloxanes containing terminal silanol radicals with silanes represented by a general formula of $R_nSiX_{4-n}$, and heating the sames. Said organopolysiloxanes containing terminal silanol radicals are conventionally used as a main raw material of silicone rubber, and is generally closed with hydroxyl groups at both terminals of the molecular chain. There is no limitation to the organic radicals combined with silicon atoms in said organopolysiloxanes, and they are exemplarily shown as alkyl radicals, such as methyl radical, ethyl radical, propyl radical, butyl radical, etc., cycloalkyl radicals, such as cyclopentyl radical, cyclohexyl radical, etc., alkenyl radicals, such as vinyl radical, allyl radical etc., aryl radicals, such as phenyl radical, tolyl radical, napthyl radical, etc., aralkyl radicals, such as 2-phenylethyl radical, etc., alkoxy radicals, such as methoxy radical, ethoxy radical, propoxy radical, etc., or their radicals in which a part of all hydrogen atoms are substituted by halogen atoms, such as chlorine atom, or amino radicals, and the like. Said organopolysiloxanes are in the polymerization degree having a viscosity of 100~1,000,000 cS, preferably 1,000~50,000 cS at 25° C. The reason resides in that when said diorganopolysiloxanes are below 100 cS (25° C.) in viscosity, it becomes difficult to obtain a cured material excellent in physical strength, and to the contrary, when they are above 1,000,000 cS (25° C.) in viscosity, the viscosity of the composition containing them becomes too high, and as a result, the workability becomes worse when the composition is used in practice.

Moreover, the condensing catalysts (curing catalysts) may be well known catalysts used in this kinds of compositions, and are indicated as metallic salts of carboxylic acids, such as lead-2-ethyloctoate, dibutyl tin dioctoate, dibutyl tin diacetate, dibutyl tin dilaurate, butyl tin-2-ethyl hexoate, iron-2-ethyl hexoate, cobalt-2-ethyl hexoate, manganese-2-ehtyl hexoate, zinc-2-ethyl hexoate, primary tin caprylate, tin naphthenate, tin oleate, tin butylate, titan naphthenate, zinc naphthenate, cobalt naphthenate, zinc stearate, etc., organic titanate esters, nolaminetitanate, tetra(isopropenyloxy)titanate, etc., organic titan compounds, such as, organosiloxytitan, β-carbonyltitan, etc., aminoalkyl-substituted alkoxysilanes, such as alkoxyaluminium compounds, 3-aminopropyltriethoxysilane, N-(trimethoxy silylpropyl)ethylenediamine, etc., amine compounds and their salts, such as, hexylamine, dodecylamine phosphate, etc., tetraammonium salts, such as, benzyltriethylammonium acetate, etc,. lower fatty acid salts of alkali metals, such as, potassium acetate, sodium acetate, litium oxalate, etc., dialkylhydroxylamines, such as, dimethylhydroxylamine, diethylhydroxylamine, etc., guanidine compounds and guanidyl containing silanes or siloxanes, such as the following formulas, etc.

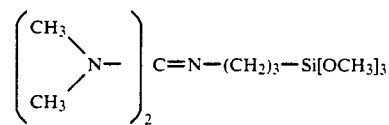

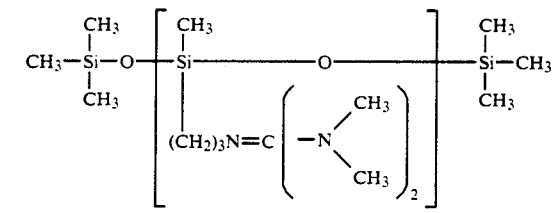

When they are placed into service, they are not limited in one kind thereof, and they may be used as a mixture of two or more kinds thereof.

The amount of said condensing catalysts to be used is in the range of 0.01~5 parts by weight, preferably 0.1~3 part by weight to 100 parts by weight of said organopolysiloxanes. When the amount is too small, it takes long time for curing, and in thick cases, it becomes difficult to homogeneously cure to a deep level, and to the contrary, when the amount is too large, the curing time becomes too short, and thus, there occurs many troubles in workability, and moreover, the obtained cured material becomes worse in heat resistant property or weather proofing property.

LIQUID B

Organopolysiloxanes having at least two silanol radicals in one molecule.

The silanol-containing organopolysiloxanes as the liquid B comprise the organopolysiloxanes containing terminal silanol radicals as a raw material of reactive organopolysiloxanes in the liquid A, and moreover, they may contain more than two silanols in one molecule. They are exemplarily shown as follows.

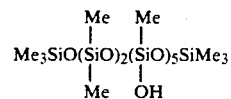

-continued

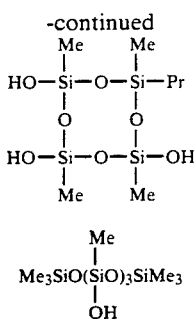

$$Me_3SiO(SiO)_3SiMe_3$$
with OH (on middle Si)

In said examples, the compounds below 100CS in viscosity may In said examples, the compounds below 100 CS in viscosity may be also used.

The liquid B may be used in the amounts of 3~500 parts by weight, preferably 50~150 parts by weight to 100 parts by weight of the liquid A. When the amount is below 3 parts by weight, it can not give enough amounts of silanols to the reactive radicals of liquid A, and thus, the physical characteristics after curing become worse. Moreover, when the amount is above 500, the silanols remain unreacted, and thus, the heat resistant property becomes extremely worse. In the present invention, the blending rate of said liquid A/liquid B is preferably 1:1 to make easy to blend.

In addition, several kinds of fillers may be added in said liquid A or B of the present invention in a suitable amount. The examples of the fillers are metallic oxides, such as, fine silica powder, silica areogel, precipitated silica, diatomaceous earth, iron oxide, zinc oxide, titan oxide, etc., or their metallic oxides treated with silanes on the surface thereof, metallic carbonates, such as, calcium carbonate, magnesium carbonate, zinc carbonate, etc., powders of synthetic resins, such as asbestos, glass wool, carbon black, fine mica powder, melted silica powder, polystyrene, polyvinyl chloride, polypropylene, and the like.

Moreover, into the liquid A or B, thixotropic agents, pigments, dystaffs, age resisters, antioxidants, antistatic agents, fire retardants, such as antimony oxide, paraffin chloride, etc., agents for improving thermal conductivity, such as, boron nitride, aluminium oxide, etc., rust inhibitors, and the like may be optionally added if necessary, and moreover, various kinds of conventional additives may be mixed therewith, and the examples of said additives are agents for giving adhesive, the so-called carbon functional silanes having amino radical, epoxy radical, thiol radical etc., metallic salts of carboxylic acids, metal alcoholates and the like. Furthermore, they may be diluted with hydrocarbon solvents, such as toluene, petrolium ether, etc., to be easily placed into service.

And then, the liquids A and B are respectively and separately introduced into the inside 1a of the mixing chamber 1 from the tanks 7 and 8 in about equal amounts by the operations of the pumps 9 and 10 through the pipes 5 and 6. At this time, spindle 11 is rotated at 100~2000 rpm, preferably 500~1500 rpm to rotate rotor 2, and liquids A and B are mixed in the mixing chamber 1. The obtained mixture is descended along with the spiral grooves 13 and 14, discharged to make a shape of a sealant on the sealing surface 18a of an article 18 to be coated (for example, an oil pan of a car shown in FIG. 1) from the tip 4a of a nozzle 4, and cured to form a sealant 19. The curing time of said sealant is 10 minutes to start the curing, and 2 hours to be wholly cured to a deep level, at the normal temperature, respectively.

In the above-described present invention, the measurement of liquids A and B in equal amounts is easily accomplished, for example, by constantly operating the pumps 9 and 10 as shown in FIG. 1 since the condensing organopolysiloxanes of two-liquid type used as the sealing material may be cured rapidly and finely to a deep level by mixing the two liquids in about equal amounts. The liquids A and B introduced into the inside 1a of the mixing chamber 1 are homogeneously and rapidly mixed by the grooves 13 and 14 formed on the surface of the rotor 2 with the easy step of rotating the rotor 2, and thus, such a trouble that they are cured during the mixing is eliminated even though the curing time of the sealing material becomes short. Moreover, the mixture never remains in the mixing chamber 1 since it resides only in the grooves.

Accordingly, the present invention is excellent in workability and is applied to on-line systems, and the discharged mixture is homogeneously cured within a short time to a deep level. The present invention will now be described in more detail by way of Example.

EXAMPLE

Into 100 parts by weight of dimethylpolysiloxane which is closed with silanols at the terminals of a molecular chain, having a viscosity of 20,000 CS/25° C., 5 parts of methyltributanooximesilane was added, and heated at 80° C. for about 3 hours to synthesize polysiloxane closed with methylbutanooximesilane at the terminals. To 90 parts by weight of said methylbutanooximesilane, 10 parts by weight of a filler (fumed silica) R-972 (manufactured by Nippon Aerogil Co.) and 0.3 parts of dibutyltin dilaurate were added, and mixed homogeneously under $N_2$ gas current to obtain liquid A.

Then, 10 parts by weight of said R-972 was mixed with 90 parts by weight of dimethylpolysiloxane closed with silanols at the terminals of a molecular chain, having a viscosity of 20,000 cs/25° C. to obtain liquid B.

The liquids A and B thus prepared were respectively and separately charged into the tanks 7 and 8 of the apparatus of FIG. 1, and at the same time, the spindle 11 of the rotor 2 were totated at a speed of about 200 rpm. Then, the liquids A and B were separately introduced into the inside 1a of the mixing chamber 1 in equal amounts by operating the pumps 9 and 10 with the same power, and were mixed. The mixing was carried out rapidly and homogeneously. The obtained mixture was descended downward through the grooves 13 and 14, discharged on the sealing surface 18a of the oil pan 18 of a car through the tip 4a of the nozzle 4, and cured to a deep level after 40 minutes to form the sealant 19. After the finish, washing liquid (such as toluene) was introduced into the mixing chamber 1 by operating the pump 17 through the pipe 16 from the tank 15 to wash the inside of the mixing chamber 1, the rotor 2, the grooves 13 and 14 and the like.

The obtained sealant 19 was measured for the properties thereof in accordance with JIS-K-6301, and as a result, the hardness was JIS-A25, the tensile strength was 18 Kgf/cm$^2$, and the elongation percentage was 420%.

According to the present invention, as mentioned above, the condensing polysiloxanes of two-liquid type used as a sealing material, which are rapidly and finely cured to a deep level by mixing the two liquids in about equal amounts, and the two liquids are homogeneously and rapidly mixed with a simple step, and then, the mixture is discharged on the sealing surface of the article to be coated, and accordingly, the present invention is excellent in workability, applied to the on-line systems, and thus, it is very available for the industry.

What is claimed is:

1. A method of forming a sealant having organopolysiloxanes as a main ingredient, in which liquids A and B are used as a sealing material, said liquid A being a mixture of organopolysiloxanes, each polysiloxane molecular chain having a radical at both terminals thereof represented by the formula $-SiR_nX_{3-n}$, wherein X is a hydrolyzable radical, R is a monovalent hydrocarbon radical, and n is 1 or 0, and a condensing catalyst, and said liquid B being organopolysiloxanes having at least two silanol radicals in one molecule, which comprises the steps of:

separately introducing said liquids A and B into a mixing chamber, said mixing chamber having a rotor secured in the inside thereof and a nozzle formed on the bottom thereof, said rotor having on the surface thereof combined grooves of longitudinal plural grooves and spiral grooves, mixing the liquids A and B in the mixing chamber by rotating the rotor, discharging the obtained mixture on the sealing surface of an article to be coated through said nozzle, and curing it to form a sealant.

2. The method of forming a sealant according to claim 1, wherein the organopolysiloxanes in liquid A are obtained by mixing the corresponding organopolysiloxanes containing terminal silanol radicals with silanes represented by a general formula of $R_nSiX_{4-n}$.

3. The method of forming a sealant according to claim 2, wherein said organopolysiloxanes are in the polymerization degree having a viscosity of $100 \sim 1,000,000$ cs at 25° C.

4. The method of forming a sealant according to claim 1, wherein said condensing catalysts are selected from the group consisting of metallic salts of carboxylic acids, organic titanate esters, organic titan compounds, aminoalkyl-substituted alkoxysilanes, amine compounds and their salts, tetraammonium salts, lower fatty acid salts of alkali metals, dialkylhydroxylamines, guanidine compounds and guanidyl containing silanes or siloxanes.

5. The method of forming a sealant according to claim 4, wherein the amount of said condensing catalysts to be used is in the range of $0.01 \sim 5$ parts by weight to 100 parts by weight of said organopolysiloxanes.

6. The method of forming a sealant according to claim 1, wherein said organopolysiloxanes in liquid B are organopolysiloxanes containing terminal silanols.

7. The method of forming a sealant according to claim 6, wherein said organopolysiloxanes contain more than two silanols per molecule.

8. The method of forming a sealant according to claim 1, wherein the blending ratio of said liquid A/liquid B is $100:3 \sim 500$ parts by weight.

9. The method of forming a sealant according to claim 8, wherein the blending ratio of said liquid A/liquid B is 1:1 part by weight.

* * * * *